United States Patent
Vanderhoff et al.

(10) Patent No.: US 9,124,853 B2
(45) Date of Patent: Sep. 1, 2015

(54) HDMI DEVICE AND INTEROPERABILITY TESTING SYSTEMS AND METHODS

(75) Inventors: Earl W. Vanderhoff, Cranston, RI (US); Alexander Laparidis, Mansfield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 809 days.

(21) Appl. No.: 12/956,789

(22) Filed: Nov. 30, 2010

(65) Prior Publication Data

US 2012/0136612 A1    May 31, 2012

(51) Int. Cl.
    G01R 31/04    (2006.01)
    G01R 31/02    (2006.01)
    G06F 3/00     (2006.01)
    G06F 3/01     (2006.01)
    H04N 5/765    (2006.01)
    H04N 17/00    (2006.01)

(52) U.S. Cl.
    CPC ............ H04N 5/765 (2013.01); H04N 17/004 (2013.01)

(58) Field of Classification Search
    CPC .................................................. H04N 17/004
    USPC ......... 702/117, 119, 135, 179, 181, 184, 186; 710/18; 725/120
    See application file for complete search history.

(56) References Cited

U.S. PATENT DOCUMENTS

| | | | |
|---|---|---|---|
| 8,154,322 B2 * | 4/2012 | Stakely et al. | 327/108 |
| 8,286,210 B2 * | 10/2012 | Boyden et al. | 725/80 |
| 8,375,150 B2 * | 2/2013 | Guillerm et al. | 710/18 |
| 2008/0048779 A1 * | 2/2008 | Crawley et al. | 330/258 |
| 2008/0120675 A1 * | 5/2008 | Morad et al. | 725/120 |
| 2009/0002556 A1 * | 1/2009 | Manapragada et al. | 348/575 |
| 2009/0013372 A1 * | 1/2009 | Oakes et al. | 725/139 |
| 2010/0271289 A1 * | 10/2010 | Goodart et al. | 345/3.1 |
| 2011/0096793 A1 * | 4/2011 | Bar-Niv et al. | 370/463 |
| 2011/0258678 A1 * | 10/2011 | Cowling et al. | 725/125 |

OTHER PUBLICATIONS

Wikipedia, HDMI, 22 pages, http://en.wikipedia.org/wiki/HDMI, as accessed on Nov. 9, 2010.
HDMI Licensing, LLC, High-Definition Multimedia Interface Specification Version 1.4, 425 pages, Jun. 5, 2009.

* cited by examiner

Primary Examiner — Eliseo Ramos Feliciano
Assistant Examiner — Felix Suarez

(57) ABSTRACT

An exemplary system includes a High-Definition Multimedia Interface ("HDMI") analyzer and an HDMI router-switch having one or more input ports connected to one or more HDMI source devices and output ports connected to the HDMI analyzer and one or more HDMI sink devices. The HDMI router-switch is configured to establish and disestablish HDMI connections between the HDMI source devices and the HDMI analyzer and HDMI sink devices. The system further includes a control subsystem configured to control the HDMI analyzer, the HDMI router-switch, the HDMI source devices, and the HDMI sink devices, wherein the control subsystem is configured to direct one or more of the HDMI analyzer, the HDMI router-switch, the HDMI source devices, and the HDMI sink devices to perform one or more operations to execute one or more automated HDMI test routines. Corresponding methods and systems are also disclosed.

25 Claims, 7 Drawing Sheets

HDMI DEVICE AND INTEROPERABILITY TESTING SYSTEMS AND METHODS

BACKGROUND INFORMATION

High-Definition Multimedia Interface ("HDMI") is an audio/video ("AV") interface commonly used to interconnect HDMI-equipped digital AV devices. Through HDMI interfaces, digital AV devices are able to transmit and receive uncompressed digital data. For example, a digital AV source device (e.g., a set-top box) can transmit digital data representative of media content to a digital AV sink device (e.g., a television) by way of an HDMI cable interconnecting the devices. Since the development of the original version of the HDMI specification known as "HDMI 1.0," a vast majority of major manufacturers of consumer electronic products has adopted the specification.

However, problems with interoperability between HDMI-certified devices have become prevalent. As an example, for a variety of possible reasons, when particular HDMI-certified devices are interconnected, certain HDMI-supported functionality of one or more of the devices may be inadvertently disabled. For instance, an HDMI-supported function of one HDMI-certified device may be disabled when the device is connected to another HDMI-certified device. As another example, certain HDMI-certified source devices may not output video and/or audio formats that are appropriate for certain HDMI-certified sink devices, and certain HDMI-certified sink devices may not respond appropriately to one or more video and/or audio formats provided by certain HDMI-certified source devices.

There are various reasons for the existence of these and other interoperability problems between HDMI-certified devices. One possible reason is the rapid development of the HDMI specification. Since the development of version 1.0 of the specification, several subsequent versions (i.e., versions 1.1, 1.2, 1.3, and 1.4) have been developed and adopted within a relatively short period of time. Each version of the specification has been designed to increase the bandwidth and/or capabilities supported by HDMI connections. Consequently, HDMI devices certified to different versions of the specification may support different HDMI connection bandwidths and/or capabilities. Unfortunately, when HDMI devices certified in accordance with different versions of the specification are connected, one or more HDMI-supported features of one of the devices may be disabled when connected to another device that does not support the same feature(s).

In addition, interoperability problems exist even between HDMI devices that have been certified to the same version of the HDMI specification. This may be due to the tiered certification requirements of the HDMI specification in which certain HDMI features and/or functions are optional for certification under the HDMI specification. Accordingly, certification of devices to the same version of the HDMI specification does not guarantee that all HDMI-supported features and/or functions will be supported by the devices or available when the devices are interconnected. Moreover, while the HDMI specification specifies HDMI device capabilities required for certification, the HDMI specification does not require specific HDMI device behavior for certification.

Another possible reason for the problems with interoperability between HDMI-certified devices is that HDMI test equipment and/or methodologies have not kept pace with the evolution of the HDMI specification or the manufacture of a wide range of HDMI-certified devices. HDMI testing is difficult for a number of reasons, including, without limitation, the massive number of different makes and models of devices that are available for interconnection in an HDMI network (e.g., in a home theater system), the unique feature sets of the different versions of the HDMI specification, the tiered certification requirements that allow manufacturers of HDMI devices to meet only a subset of the entire specification, the plethora of media content (e.g., audio and video) formats that are available, and the historically sporadic or intermittent nature of HDMI interoperability problems.

To comprehensively test HDMI devices for interoperability problems using conventional HDMI testing equipment and/or methodologies would require an enormous physical footprint (to cover the massive number of different makes and models of equipment and possible configurations in which they can be interconnected), consume significant amounts of personnel resources (to perform manual testing operations), and be extremely costly. Therefore, there is a need for new and/or improved HDMI testing equipment and/or methodologies.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
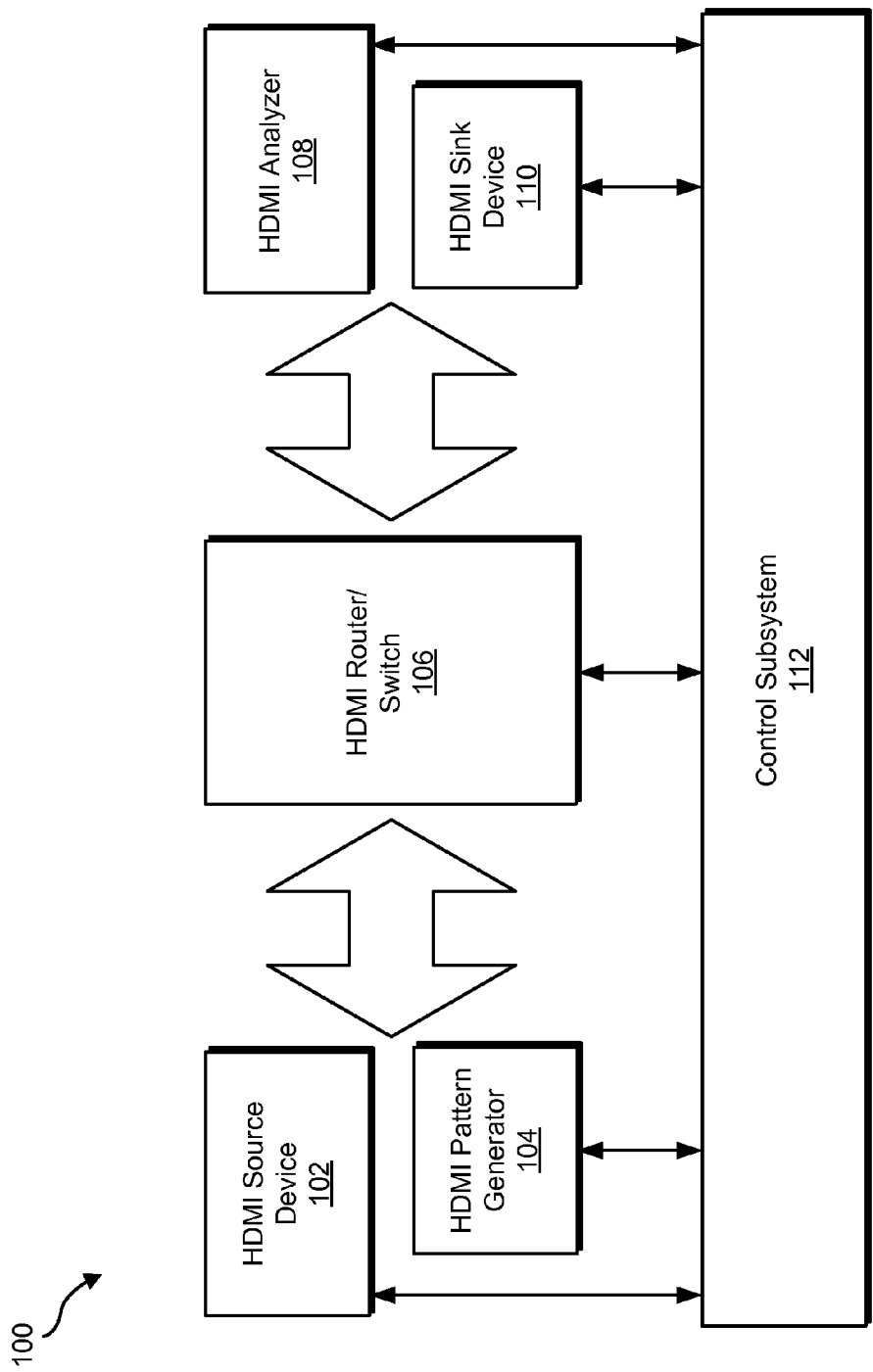
FIG. 1 illustrates an exemplary HDMI testing system according to principles described herein.

Exemplary HDMI device and interoperability testing systems and methods are described herein. The exemplary systems and methods provide for automated testing of HDMI devices (e.g., HDMI source and/or sink devices) and interoperability between interconnected HDMI devices.

In an exemplary embodiment, a system may include an HDMI pattern generator, HDMI analyzer, and an HDMI router and/or switch having input ports connected to the HDMI pattern generator and one or more HDMI source devices and output ports connected to the HDMI analyzer and one or more HDMI sink devices. The HDMI router may be configured to establish and disestablish HDMI connections between the HDMI pattern generator, the one or more HDMI source devices, the HDMI analyzer, and the one or more HDMI sink devices. The system may further include a control subsystem configured to control the HDMI pattern generator, the HDMI analyzer, the HDMI router, the one or more HDMI source devices, and the one or more HDMI sink devices. The control subsystem may direct one or more of the HDMI pattern generator, the HDMI analyzer, the HDMI router, the one or more HDMI source devices, and the one or more HDMI sink devices to perform one or more operations to execute one or more automated HDMI test routines. The automated HDMI test routines may include one or more HDMI source device testing routines, one or more HDMI interoperability testing routines, and one or more HDMI sink device testing routines. Examples of such automated testing routines are described in detail herein.

Through the execution of one or more automated HDMI test routines as described herein, HDMI devices and/or interoperability between interconnected HDMI devices may be tested in an automated manner that may reduce the amount of manual testing operations and/or costs required by conventional HDMI testing equipment and methodologies (e.g., by alleviating the manual labor and/or physical footprint requirements of conventional HDMI testing equipment and methodologies). In addition, the automated HDMI testing described herein may facilitate and make more convenient and/or practical the behavioral HDMI testing of the many different makes and models of HDMI devices, as well as the many different possible interconnection configurations of such devices. The automated HDMI testing may provide a degree of confidence that an HDMI device will function appropriately and/or as expected when connected to one or more other HDMI devices, determine any functions of an HDMI device that might be prone to failure when the HDMI device is connected to one or more other HDMI devices, identify test failures, and/or provide one or more tools for performing root cause analysis for identified test failures.

In certain applications, the automated HDMI testing may be applied to select HDMI devices and/or HDMI device interconnection configurations prior to, in conjunction with, and/or otherwise associated with production, quality assurance testing, and/or release of the HDMI devices and/or upgrades to the HDMI devices. For example, new or upgraded HDMI devices may be provided to an HDMI testing facility implementing the systems and methods described herein for subjection to automated HDMI testing, which may help a manufacturer discover potential HDMI behavior and/or interoperability problems before release of the new or upgraded HDMI devices.

FIG. 1 illustrates an exemplary HDMI testing system 100 (or simply "system 100"). As shown in FIG. 1, system 100 may include an HDMI source device 102, an HDMI pattern generator 104, an HDMI router-switch 106, an HDMI analyzer 108, an HDMI sink device 110, and a control subsystem 112 configured to communicate with one another as shown. As described herein, control subsystem 112 may be configured to control one or more of HDMI source device 102, HDMI pattern generator 104, HDMI router-switch 106, HDMI analyzer 108, and HDMI sink device 110, including directing one or more of HDMI source device 102, HDMI pattern generator 104, HDMI router-switch 106, HDMI analyzer 108, and HDMI sink device 110 to perform one or more operations to execute one or more automated HDMI test routines.

Each of the elements of system 100, as well as connections and communications between the elements, will now be described in additional detail.

HDMI source device 102 may include any electronic device configured to generate and output an HDMI signal (e.g., an HDMI signal carrying media content such as video and/or audio content). For example, HDMI source device 102 may include, without limitation, customer premises equipment ("CPE"), a set-top box, a Digital Video Disc ("DVD") player, a Blu-ray disc player, a Digital Video Recorder ("DVR") device, a gaming console, a computer, a video camera, and/or a media player. As such, HDMI source device 102 may be configured to process media content and output an HDMI signal carrying the media content.

HDMI sink device 110 may include any electronic device configured to receive and process an HDMI signal (e.g., an HDMI signal carrying media content such as video and/or audio content). For example, HDMI sink device 110 may include, without limitation, CPE, a television, a monitor, a display device, an audio system, and/or an audio component (e.g., an audio speaker, subwoofer, etc.). As such, HDMI sink device 110 may be configured to receive and process an HDMI signal carrying media content, and to present audio and/or video content included in the media content for experiencing by a user.

HDMI pattern generator 104 may include any electronic device configured to generate and output HDMI signals. In particular, HDMI pattern generator 104 may be configured to generate and output HDMI signals such as one or more patterns of HDMI signals (e.g., HDMI digital video and/or audio in various video and/or audio formats) that may be used for testing, as described herein.

HDMI analyzer 108 may include any electronic device configured to receive and analyze HDMI signals, including analyzing HDMI video and/or audio formats and/or video and/or audio information frames including in HDMI signals. In certain embodiments, HDMI analyzer 108 may be further configured to generate and output one or more HDMI signals that may be used for testing, as described herein.

HDMI router-switch 106 may include one or more electronic devices configured to establish and disestablish HDMI connections between HDMI pattern generator 104, HDMI source device 102, HDMI analyzer 108, and HDMI sink device 110. To this end, HDMI router-switch 106 may include one or more input ports to which HDMI source device 102 and/or HDMI pattern generator 104 may be physically connected by one or more HDMI cables. HDMI router-switch 106 may also include one or more output ports to which HDMI analyzer 108 and/or HDMI sink device 110 may be physically connected by one or more HDMI cables. HDMI router-switch 106 may be configured to establish and disestablish HDMI connections between HDMI source device 102, HDMI pattern generator 104, HDMI analyzer 108, and HDMI sink device 110 by routing HDMI signals between select input and output ports and/or by switching connections between input and output ports. The routing and/or switching may be on a one-to-one and/or one-to-many basis. For example, HDMI router-switch 106 may receive an HDMI signal from HDMI pattern generator 104 and route the HDMI signal to either or both of HDMI analyzer 108 and HDMI sink device 110.

In certain embodiments, HDMI router-switch 106 may be configured to function as an HDMI router and/or an HDMI switch. HDMI router-switch 106 may be implemented by a single electronic device or multiple electronic devices (e.g., an HDMI router and a separate HDMI switch that may be swapped in and out for various test routines).

While FIG. 1 shows a single HDMI source device 102 and a single HDMI sink device 110, this is illustrative only and not limiting. In other examples, multiple HDMI source devices 102 and/or multiple HDMI sink devices 110 may be physically connected to HDMI router-switch 106 at the same time. Accordingly, one or more of the HDMI test routines and/or associated operations described herein may be applied to a specific HDMI source device or to all HDMI source devices connected to HDMI router-switch 106 concurrently and/or in turn. This may help to maximize efficiency by executing automated HDMI test routines to test HDMI devices in batches and/or in various interconnection configurations. In addition, system 100 may be scaled to include additional HDMI source devices 102, HDMI pattern generators 104, HDMI router-switch devices 106, and/or HDMI analyzers 108 that may also be connected to and subject to control by control subsystem 112, which may provide efficiencies of scale.

As mentioned, control subsystem 112 may be configured to control any of the other elements of system 100 (i.e., any of HDMI source device 102, HDMI pattern generator 104, HDMI router-switch 106, HDMI analyzer 108, and HDMI sink device 110), including directing any of the other elements of system 100 to perform one or more operations to execute one or more automated HDMI test routines. To this end, control subsystem 112 may include any component or set of components configured to communicate with, interact with, or otherwise control any of the other elements of system 100. Any suitable technologies may be employed by control subsystem 112 to communicate with, interact with, and/or otherwise control any of the other elements of system 100. For example, in certain embodiments, control subsystem 112 may be configured to output or initiate output of one or more infrared ("IR") signals to HDMI source device 102 and/or HDMI sink device 110 to direct HDMI source device 102 and/or HDMI sink device 110 to perform one or more operations. In addition, RS-232 communications technologies may be employed by control subsystem 112 to control HDMI pattern generator 104 and/or in HDMI analyzer 108, and TCP/IP communications technologies may be employed by control subsystem 112 to control HDMI router-switch 106. Such a configuration is illustrative only—any other suitable technologies (e.g., User Datagram Protocol ("UDP"), Simple Network Management Protocol ("SNMP"), Internet Control Message Protocol ("ICMP"), Hypertext Transfer Protocol ("HTTP"), Secure Shell ("SSH"), etc.) may be employed by control subsystem 112 to control operations of, interrogate, and/or otherwise obtain feedback from one or more of the other elements of system 100.

Control subsystem 112 may be configured to direct any of the other elements of system 100 to perform one or more operations that may be helpful for HDMI testing. Examples of such operations may include, without limitation, generating and outputting an HDMI signal, generating and providing a test signal, blocking and/or replacing an HDMI signal with a test signal, configuring a device for a particular video format (e.g., a particular resolution, scan format (e.g., progressive or interlaced scanning), refresh rate, etc.), generating and providing output for a particular video format, changing video output format, tuning to a media content source (e.g., tuning to a media content carrier channel), tuning away from one media content source to another media content source (e.g., tuning away from one media content carrier channel to another media content carrier channel), tuning to a particular source of video having a particular video format, cycling power to a device (e.g., warm power cycling and/or cold power cycling a device), configuring a device for a particular sound format (e.g., surround sound, stereo, mono, Pulse Code Modulation ("PCM"), Audio Codec 3 ("AC3"), etc.), tuning to a particular audio source to receive audio input, providing a test Extended Display Identification Data ("EDID") signal, responding to a test EDID signal, outputting one or more Consumer Electronics Control ("CEC") operational codes, configuring HDMI pattern generator 104 to emulate a particular HDMI source device 102, configuring HDMI analyzer 108 to emulate a particular HDMI sink device 110, "hot plugging" an HDMI connection (i.e., establishing, disestablishing, or disestablishing and reestablishing an HDMI connection), High-Bandwidth Digital Content Protection ("HDCP") signaling (e.g., HDCP handshaking), and any other operations that HDMI source device 102, HDMI pattern generator 104, HDMI router-switch 106, and/or HDMI analyzer 108 are capable of performing.

Control subsystem 112 may include any components helpful for directing or otherwise causing any of the other elements of system 100 to perform any of the above-listed operations. For example, in order to cold power cycle an element of system 100, the element may be connected to power (e.g., A/C power) through control subsystem 112, and control subsystem 112 may be configured to disconnect the element from power (e.g., by turning off a power source or physically disconnecting the element from a power source). In order to warm power cycle an element of system 100, control subsystem 112 may be configured to direct the element to turn off power and then to turn on power at the element. The direction may be provided in any suitable way, such as by transmitting a "power off" signal followed by a "power on" signal that the element is configured to recognize and respond to by turning power off and then on at the element.

As another example, in order to "hot plug" one or more other elements of system 100, control subsystem 112 may be configured to direct HDMI router-switch 106 to physically form a connection between HDMI devices, physically tear down a connection between HDMI devices, or physically tear down and then reform a connection between HDMI devices. Such automated establishing and disestablishing of an HDMI connection may be performed in any suitable way. For instance, HDMI source device 102 and HDMI sink device 110 may be respectively connected to an input port and an output port of HDMI router-switch 106. Control subsystem 112 may direct HDMI router-switch 106 to form or tear down a physical connection between the input and output ports in order to form or tear down an HDMI connection between HDMI source device 102 and HDMI sink device 110. In this or another manner, control subsystem 112 may control "hot plugging" of one or more other elements of system 100.

Control subsystem 112 may be configured to obtain feedback from any of the other elements of system 100. For example, control subsystem 112 may be configured to directly interrogate any of the other elements of system 100. For instance, using any of the communications technologies mentioned above, control subsystem 112 may communicate with any of the other elements of system 100 to request information from the elements. Accordingly, control subsystem 112 may be able to obtain data representative of testing operations and/or results. To illustrate, control subsystem 112 may interrogate HDMI source device 102 or HDMI pattern generator 104 for data representative of HDMI signals output by HDMI source device 102 or HDMI pattern generator 104, HDMI router-switch 106 for data representative of the settings of HDMI router-switch 106 and/or HDMI signals passed through HDMI router-switch 106, and/or HDMI analyzer 108 or HDMI sink device 110 for data representative of HDMI signals received by the elements. Control subsystem 112 may be further configured to interrogate HDMI analyzer 108 for data representative of any analysis of HDMI signals performed by HDMI analyzer 108.

Additionally or alternatively, control subsystem 112 may be configured to obtain feedback indirectly from one or more of the other elements of system 100. For example, control subsystem 112 may include one or more cameras configured to capture images of displayed content such as content displayed on a display screen by content sink device 110. Control subsystem 112 may be further configured to analyze captured images such that the analysis may be used to trigger and/or determine further operations by control subsystem 112 (e.g., to determine what operations to direct HDMI source device 102 to perform next based on content rendered onscreen by HDMI sink device 110) and/or to check whether correct video is rendered by content sink device 110. In addition or alternative to including one or more cameras, control subsystem 112 may include one or more microphones configured to capture output audio (e.g., audio output by content sink device 110). Control subsystem 112 may be further configured to analyze captured audio content such that the analysis may be used to trigger and/or determine further operations by control subsystem 112 (e.g., to determine what operations to direct HDMI source device 102 to perform next based on audio content rendered by HDMI sink device 110) and/or to check whether correct audio is rendered by content sink device 110.

Control subsystem 112 may include or be implemented by any suitable device or devices configured to perform the control subsystem 112 operations described herein. For example, control subsystem 112 may include or be implemented by one or more physical computing devices and one or more interfaces between the one or more physical computing devices of control subsystem 112 and any of HDMI source device 102, HDMI pattern generator 104, HDMI router-switch 106, HDMI analyzer 108, and HDMI sink device 110.

Control subsystem 112 may include a user interface through which a user may configure control subsystem 112. For example, through the user interface, a user may define one or more HDMI test routines to be executed by control subsystem 112 to test any of the other elements of system 100 and/or interoperability between any of the other elements of system 100.

Control subsystem 112 may maintain data representative of one or more automated HDMI test routines and may utilize the data to execute any of the one or more automated HDMI test routines. Control subsystem 112 may execute an automated HDMI test routine by controlling operations of and obtaining feedback from any of the other elements of system 100.

Exemplary automated HDMI test routines will now be described in detail. In certain embodiments, exemplary HDMI test routines may include source test routines configured to test behavior of one or more HDMI source devices (e.g., HDMI source device 102) in specific HDMI environments, interoperability test routines configured to test interoperability between interconnected HDMI devices (e.g., interoperability between HDMI source device 102 and HDMI sink device 110), and/or sink test routines configured to test behavior of one or more HDMI sink devices (e.g., HDMI sink device 110).

Source, interoperability, and sink test routines may be executed independently or dependently of one another, concurrently, in turn, in a particular order, and/or in a particular combination. For example, in certain embodiments, one or more sink test routines may be performed in response to a failed interoperability test routine.

Control subsystem 112 may execute source test routines to test any functions of HDMI source devices related to the HDMI specification. For example, source test routines may be configured to determine whether HDMI source device 102 interprets EDID correctly, outputs correct video and/or audio formats and with appropriate timing in response to EDID directives, outputs correct video and audio information frames, successfully HDCP handshakes with HDMI sink device 110, communicates appropriately across the CEC bus, responds accordingly to CEC operational codes, and/or does not interfere with CEC-enabled HDMI devices to which HDMI source device 102 is connected.

In accordance with the HDMI specification, information about interconnected HDMI devices may be shared between the devices so that the devices are able to determine the makes, models, and/or capabilities (e.g., supported and/or preferred video and/or audio format capabilities, settings, and/or timings, audio speaker assignments, display size, display luminance data, display pixel mapping data, etc.) of one another. The shared information is shared between HDMI devices as EDID, which includes data defined in accordance with a Video Electronics Standards Association ("VESA") standard. When HDMI sink device 110 is connected to HDMI source device 102 by an HDMI connection, HDMI sink device 110 may send an EDID message to HDMI source device 102 via the HDMI connection such that HDMI source device 102 may determine the make, model, and/or capabilities of HDMI sink device 110. From the EDID message, HDMI source device 102 may determine one or more video and/or audio formats that HDMI sink device 110 is configured and/or prefers to process and rescale the output of HDMI source device 102 based on the EDID message and any other predefined factors (e.g., factors associated with an application, such as an interactive media guide application, executing on HDMI source device 102).

Source test routines may be configured for determining whether HDMI source device 102 interprets EDID correctly and/or outputs appropriate signals in response to EDID. In certain source test routines, control subsystem 112 may direct one or more other elements of system 100 to block and replace an actual EDID signal provided by HDMI sink device 110 with a test EDID signal (e.g., an EDID test file). The blocking may be performed in any suitable way, including by detecting and blocking the EDID signal from HDMI sink device 110 at HDMI router-switch 106 and/or dynamically configuring HDMI router-switch 106 such that an HDMI connection between HDMI source device 102 and HDMI sink device 110 is not established. Accordingly, HDMI source device 102 may receive the test EDID signal (which may be provided by HDMI analyzer 108) and output video and/or audio signals that may be based on the test EDID signal. The output signals may be analyzed (e.g., compared to data representative of expected behavior of HDMI source device 102) to determine whether HDMI source device 102 has interpreted the test EDID signal correctly and/or output appropriate video and/or audio signals in response to the test EDID signal.

In accordance with the HDMI specification, an HDMI source device may output an HDMI signal that includes video and audio information frames containing information that may be used by an HDMI sink device to appropriately process the HDMI signal. For example, information frames in an HDMI signal may specify video and/or audio formats of the HDMI signal. Accordingly, the HDMI sink device may use the information frames to determine video and/or audio format information to be used to process the HDMI signal. For example, the HDMI sink device may determine when an HDMI signal contains a two-dimensional ("2D"), three-dimensional ("3D"), standard definition ("SD") resolution, or high definition ("HD") resolution video format signal. The HDMI sink device may also use the information frames to determine when the video format of the HDMI signal changes (e.g., due to a change from an SD resolution content source to an HD resolution content source).

Source test routines may be further configured for determining whether HDMI source device 102 outputs appropriate video and audio information frames for a particular EDID directive. To this end, source test routines may include analysis of information frames included in an HDMI signal output by HDMI source device 102. The analysis may include comparing the output HDMI signal to data representative of expected behavior of HDMI source device 102.

HDMI devices may be configured to support HDCP signaling and encryption in compliance with the HDCP specification. When HDMI devices configured to support HDCP are interconnected, the HDMI devices may at appropriate times perform an HDCP handshake to determine, before protected content is distributed between the HDMI devices, whether the HDMI devices are HDCP compliant.

Source test routines may be further configured for determining whether HDMI source device 102 successfully HDCP handshakes with connected HDMI sink device 110. To this end, source test routines may include analysis of HDCP signaling between HDMI source device 102 and HDMI sink device 110, including analysis of HDCP handshaking between HDMI source device 102 and HDMI sink device 110. The analysis may include comparing the HDCP signaling to data representative of expected behavior of HDMI source device 102.

CEC is a one-wire bidirectional serial bus that uses the AV.link protocol to perform remote control functions between interconnected HDMI devices. According to the HDMI specification, CEC wiring is mandatory, although implementation of CEC is optional. CEC is designed to allow a user to command and control multiple CEC-enabled HDMI devices with a single remote control and/or to allow the individual CEC-enabled HDMI devices to command and control one other without user intervention.

Source test routines may be further configured for determining whether HDMI source device 102 communicates appropriately across the CEC bus, responds accordingly to CEC operational codes, and/or does not interfere with CEC-enabled devices connected to HDMI source device 102. To this end, the source test routines may include one or more operations for testing CEC operations and/or interference. Examples of such operations are described in more detail below.

Control subsystem 112 may execute source test routines by directing HDMI source device 102 to repeatedly perform one or more operations, obtaining feedback data from HDMI source device 102 and/or any other element of system 100, and by analyzing the feedback data (e.g., by analyzing video and/or audio signals output by HDMI source device 102 and/or received by HDMI analyzer 108). Source test routines may include one or more routines for testing video output by HDMI source device 102, one or more routines for testing audio output by HDMI source device 102, one or more routines for testing CEC operability of HDMI source device 102, and/or one or more routines for testing CEC interference of HDMI source device 102. Exemplary video source test routines, audio source test routines, CEC operability test routines, and CEC non-interference test routines will now be described.

FIGS. 2-5 illustrate exemplary HDMI source testing methods 200-500, which may include or be part of one or more source test routines. While FIGS. 2-5 illustrate exemplary steps according to certain embodiments, other embodiments may omit, add to, reorder, combine, and/or modify any of the steps shown in FIGS. 2-5. The steps shown in FIGS. 2-5 may be performed by control subsystem 112 and/or any other element or elements of system 100.

Figure 2:
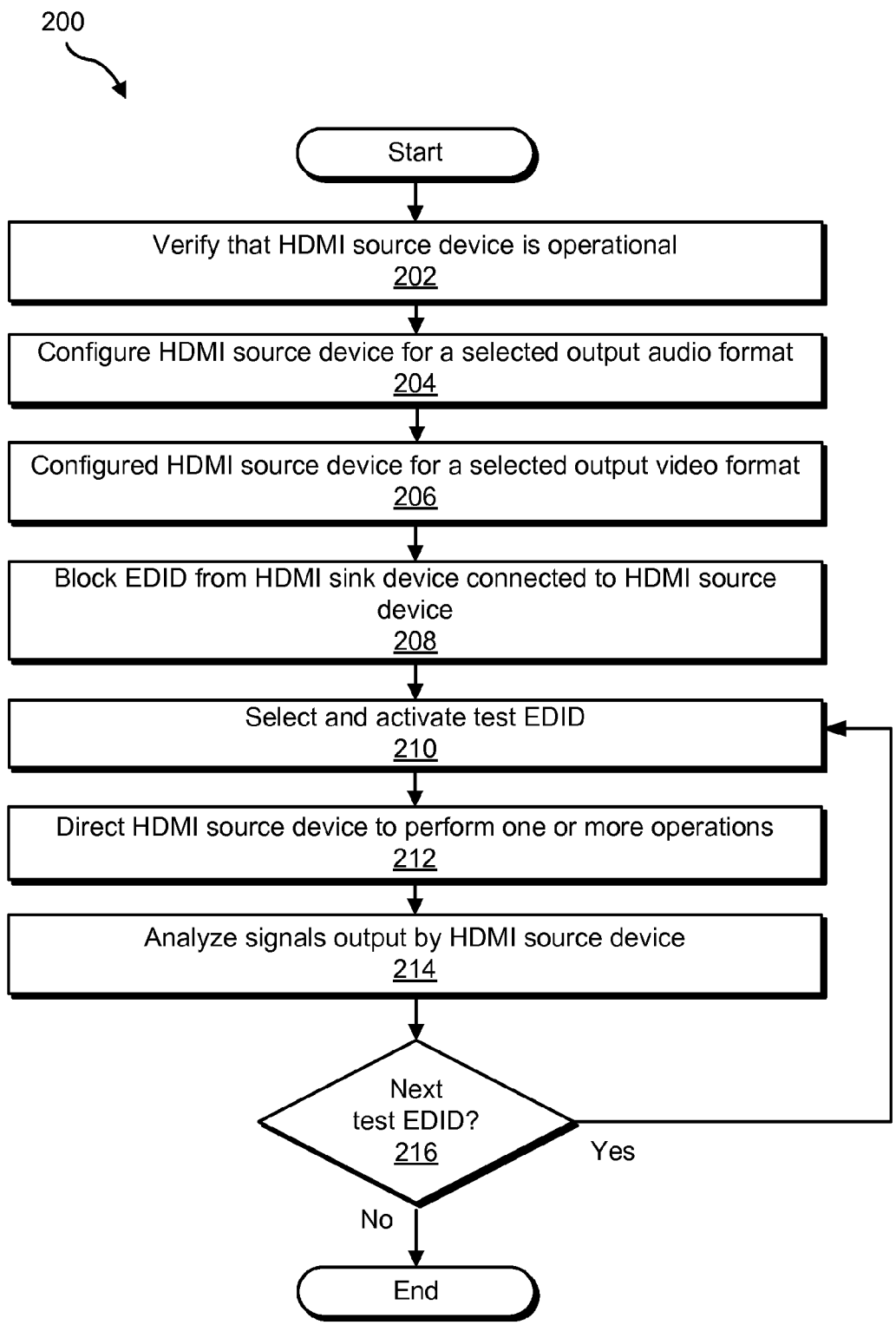
FIGS. 2-5 illustrate exemplary HDMI source testing methods according to principles described herein.

Referring to FIG. 2, in step 202 of method 200, control subsystem 112 may verify that HDMI source device 102 is operational. To this end, control subsystem 112 may be configured to communicate with and/or direct HDMI source device to perform one or more operations in order to determine that HDMI source device is fully operational and/or to configure HDMI source device 102 for full operation.

In step 204, HDMI source device 102 may be configured for a selected output audio format. For example, control subsystem 112 and/or HDMI source device 102 may configure HDMI source device 102 to output a default audio format (e.g., surround sound).

In step 206, HDMI source device 102 may be configured for a selected output video format. For example, control subsystem 112 and/or HDMI source device 102 may configure HDMI source device 102 to output a default video format (e.g., a particular output video resolution).

In step 208, EDID from HDMI sink device 110 connected to HDMI source device 102 may be blocked. The blocking may be performed in any suitable way. As an example, control subsystem 112 may direct HDMI router-switch 106 to implement a configuration in which HDMI sink device 110 is physically not connected to HDMI source device 102. As an example in which HDMI sink device 110 is connected to HDMI source device 102 via HDMI router-switch 106, control subsystem 112 may direct HDMI router-switch 106 to detect, intercept, or otherwise block an EDID signal provided by HDMI sink device 110 and/or directed to HDMI source device 102.

In step 210, test EDID may be selected and activated. For example, control subsystem 112 may select test EDID (e.g., an EDID test file) to be provided to HDMI source device 102 for testing. The test EDID may specify any particular display device information (e.g., particular audio and/or video formats) that may be used to test how HDMI source device 102 interprets and/or responds to EDID. In certain embodiments, HDMI analyzer 108 may maintain a library of test EDID, and control subsystem 112 may direct HDMI analyzer 108 to send a test EDID signal containing any particular test EDID within the library to HDMI source device 102 via an HDMI connection. In response to receiving the test EDID signal, HDMI source device 102 and any HDMI sink device (e.g., HDMI sink device 110) connected thereto may rescale (e.g., by changing output and/or input audio and/or video settings) based on the test EDID.

In step 212, HDMI source device 102 may be directed to perform one or more operations. For example, control subsystem 112 may direct HDMI source device 102 to perform one or more operations such that HDMI source device 102 may be tested in accordance with one or more source test routines executed by control subsystem 112. Examples of such operations are described herein, particularly in reference to FIGS. 3-5.

In step 214, one or more signals output by HDMI source device 102 may be analyzed. For example, control subsystem 112 may interrogate HDMI source device 102 and/or any of the other elements of system 100 to obtain and analyze an HDMI signal output by HDMI source device 102 in association with the one or more operations performed in step 212.

Steps 212 and 214 may be performed for each particular set of test EDID. For example, steps 212 and 214 may be performed with respect to the particular test EDID selected and activated in step 210. After completion of steps 212 and 214 for the selected test EDID, control subsystem 112 may be configured to determine, in step 216, whether there is another set of test EDID to be tested. If there is not another set of test EDID to be tested, method 200 may end. If, however, control subsystem 112 determines that there is another set of test EDID to be tested, processing may move from step 216 to step 210, and steps 210 through 216 may be repeated for the other set of test EDID. For instance, the other set of test EDID may specify different audio and/or video formats. Accordingly, steps 210-216 may be repeated for each specific set of test EDID such that different audio and/or video formats may be tested by performing steps 212 and 214 for each particular set of test EDID.

Figure 3:
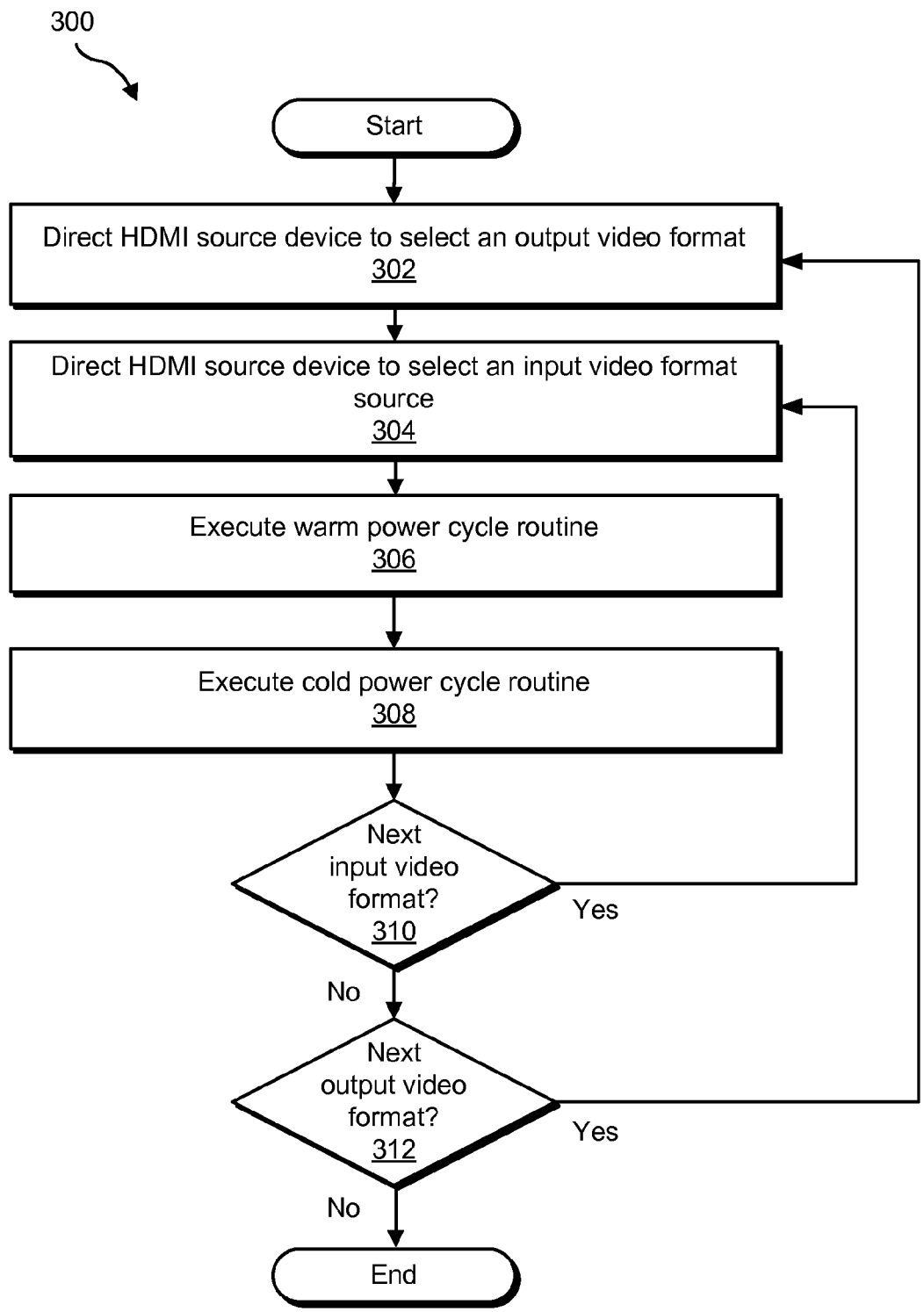

FIG. 3 illustrates an exemplary video source testing method 300. In certain embodiments, method 300 may be performed as part of steps 212 and/or 214 of FIG. 2.

In step 302, control subsystem 112 may direct HDMI source device 102 to select an output video format. For example, control subsystem 112 may direct HDMI source device 102 to select a particular output video resolution supported by HDMI source device 102.

In step 304, control subsystem 112 may direct HDMI source device 102 to select an input video format source. For example, control subsystem 112 may direct HDMI source device 102 to select a particular content source that provides input to HDMI source device 102 in a particular video format supported by HDMI source device 102. In certain examples, step 304 may include HDMI source device 102 tuning to a particular media content carrier channel or otherwise accessing content from a source that provided video content defined in accordance with the particular video format.

In step 306, a warm power cycle routine may be executed. The warm power cycle routine may include cycling the power at HDMI source device 102 and/or HDMI sink device 110. For example, control subsystem 112 may communicate with HDMI source device 102 to direct HDMI source device 102 to power off and then power back on. In response, HDMI source device 102 may initiate a power-down sequence followed by a power-up sequence typically executed by HDMI source device 102 when an on/off command (e.g., an IR on/off command provided by a user-operated remote control device) is received by HDMI source device 102. HDMI sink device 110 may be similarly warm power cycled before, concurrent to, or after the warm power cycling of HDMI source device 102.

The warm power cycle routine in step 306 may further include control subsystem 112 obtaining feedback before and after an HDMI device is warm power cycled. The feedback may be obtained by control subsystem 112 directly or indirectly from any of the elements of system 100. For example, control subsystem 112 may interrogate HDMI source device 102 for particular information (e.g., an HDMI signal output by HDMI source device 102) both before and after the warm power cycling of HDMI source device 102. Additionally or alternatively, control subsystem 112 may interrogate HDMI sink device 110 for particular information (e.g., an HDMI signal output by HDMI source device 102 and/or received by HDMI sink device 110) both before and after the warm power cycling of HDMI sink device 110.

In certain examples, feedback requested and obtained by control subsystem 112 before and after a warm power cycle may include information descriptive of video resolution, scan type (e.g., interlaced or progressive scan), scan rate, audio format, and/or HDCP handshaking associated with an HDMI signal. Additionally or alternatively, before and after a warm power cycling of an HDMI device, control subsystem 112 may capture feedback for use in confidence monitoring. In certain examples, this feedback may include information specified in one or more information frames of an HDMI signal output by HDMI source device 102 and/or information representative of display content displayed by HDMI sink device 110. For example, an HDMI signal may be processed such that information frames (e.g., audio and/or auxiliary video information frames) may be analyzed. As another example, a display picture (e.g., such as may be displayed by HDMI sink device 110) may be captured by one or more cameras and processed (e.g., with optical character and/or pattern recognition technologies) to determine whether video is rendered and/or the quality with which the video is rendered.

In step 308, a cold power cycle routine may be executed. Step 308 may be executed similarly to step 306, except that rather than a warm power cycling of HDMI source device 102 and/or HDMI sink device 110, control subsystem 112 may cold power cycle HDMI source device 102 and/or HDMI sink device 110 by physically cutting off power (e.g., AC power) to HDMI source device 102 and/or HDMI sink device 110. In certain examples, the power may be physically cut off within control subsystem 112, which may simulate an expected or unexpected loss of AC power to HDMI source device 102 and/or HDMI sink device 110.

After steps 306 and 308 have been performed for the input video format source selected in step 304, control subsystem 112 may determine, in step 310, whether there is another input video format to be tested. If there is another input video format to be tested, processing may move from step 310 to step 304, in which control subsystem 112 may direct HDMI source device 102 to select another input video format source (e.g., by tuning to another content carrier channel carrying content having a different video format). Steps 306 and 308 may then be performed for the other input video format source selected in step 304. In this or a similar manner, control subsystem 112, through repetition of steps 304-310, may step through and conduct testing for each source video format supported by HDMI source device 102. To illustrate, HDMI source device 102 may be configured to receive input video in 480i, 480p, 720p, and 1080i video formats, and steps 304-310 may be repeated for each of the source video formats.

Returning to step 310, if control subsystem 112 determines that there is no other input video format to be tested, processing may move to step 312. In step 312, control subsystem 112 may determine whether there is another output video format to be tested. If there is, processing may move from step 312 to step 302, in which another output video format may be selected. Steps 304-310 may then be repeated for the other output video format selected in step 302. In this or similar manner, through repetition of steps 302-312, control subsystem 112 may step through and conduct testing for each output video format supported by HDMI source device 102. To illustrate, HDMI source device 102 may be configured to output video in 480i, 480p, 720p, and 1080i video formats, and steps 302-312 may be repeated for each of the video formats.

Returning to step 312, if control subsystem 112 determines that there is no other output video format to be tested, method 300 may end.

Table 1, which is presented below, lists exemplary operations that may be performed by one or more elements of system 100 when methods 200 and 300 are executed for a set-top box ("STB") connected to a television ("TV").

TABLE 1

Exemplary Video Source Test Operations

Figure 4:
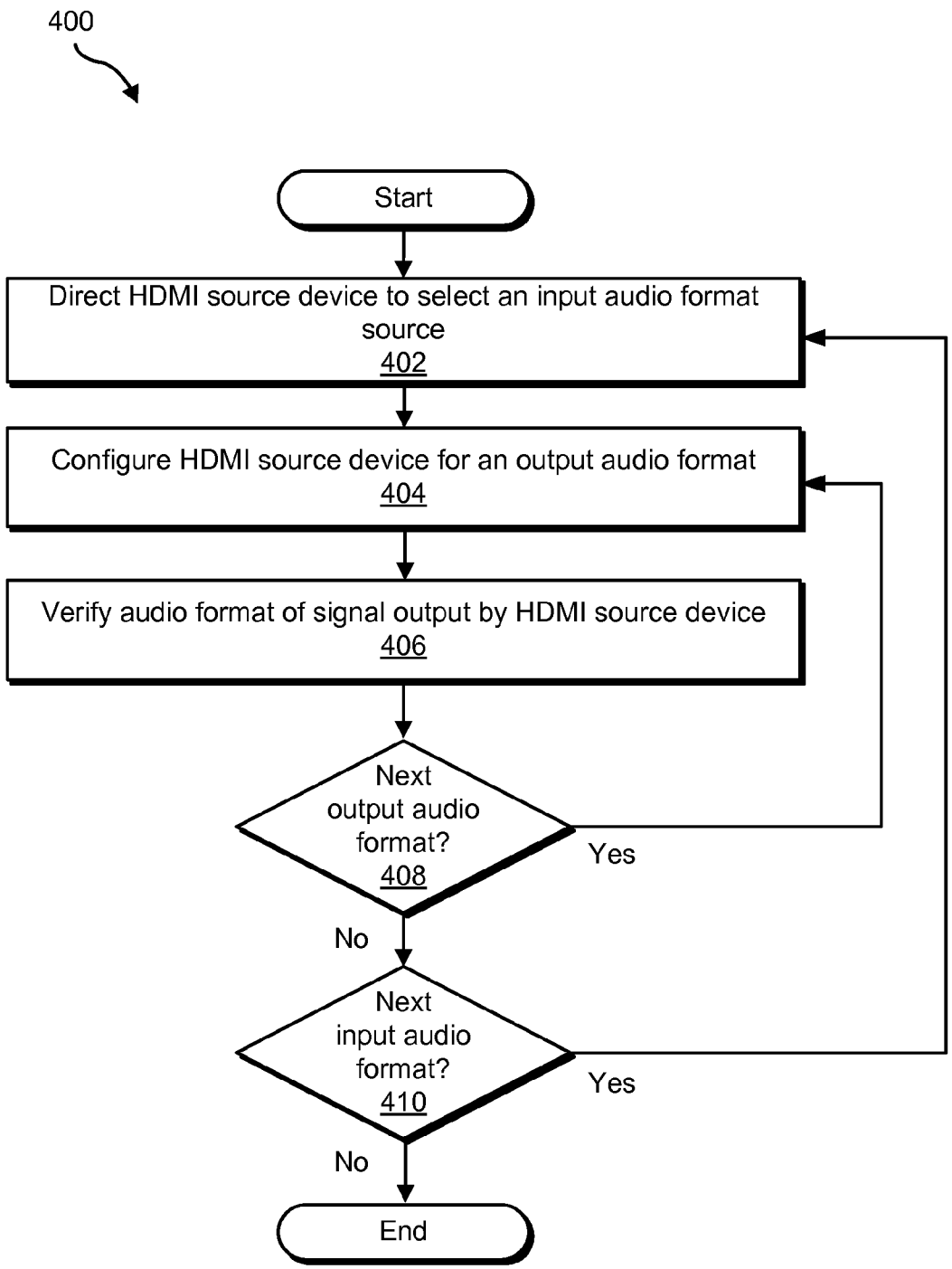

1. Ensure STB is fully operational
2. Configure STB for Surround Sound
3. Configure STB for selected video format (e.g., 480i, 480p, 720p, or 1080i)
4. Activate selected EDID (e.g., 480i, 480p, 720p, or 1080i)
5. While tuning SD programming, analyze STB output
6. While tuning SD programming, replay SD from hard disk drive ("HDD") and analyze STB output
7. While tuning SD programming, replay HD from HDD and analyze STB output
8. While tuning SD programming, warm cycle STB then TV and analyze STB output
9. While tuning SD programming, warm cycle TV then STB and analyze STB output TABLE 1-continued Exemplary Video Source Test Operations 10. While tuning SD programming, AC cycle STB and analyze STB output
11. While tuning SD programming, AC cycle TV and analyze STB output
12. Channel change SD to HD and analyze STB output
13. While tuning HD programming, warm cycle STB then TV and analyze STB output
14. While tuning HD programming, warm cycle TV then STB and analyze STB output
15. While tuning HD programming, AC cycle STB and analyze STB output
16. While tuning HD programming, AC cycle TV and analyze STB output
17. Change channel HD to SD and analyze STB output
18. Reconfigure STB selected video format (e.g., 480i, 480p, 720p, or 1080i)
19. While tuning SD programming, analyze STB output
20. Change channel SD to HD and analyze STB output
21. Reconfigure STB selected video format (e.g., 480i, 480p, 720p, or 1080i)
22. While tuning HD programming, analyze STB output
23. Change channel HD to SD and analyze STB output
24. Reconfigure STB selected video format (e.g., 480i, 480p, 720p, or 1080i)
25. While tuning SD programming, analyze STB output
26. Change channel SD to HD and analyze STB output FIG. 4 illustrates an exemplary audio source testing method 400. In certain embodiments, method 400 may be performed as part of steps 212 and/or 214 of FIG. 2.

In step 402, control subsystem 112 may direct HDMI source device 102 to select an input audio format source. For example, control subsystem 112 may direct HDMI source device 102 to select a particular content source that provides input to HDMI source device 102 in a particular audio format supported by HDMI source device 102. In certain examples, step 402 may include HDMI source device 102 tuning to a particular media content carrier channel or otherwise accessing a content source that provided audio content defined in accordance with the particular audio format such as AC3 or PCM audio format.

In step 404, HDMI source device 102 may be configured for a particular output audio format (e.g., surround sound, stereo, or mono audio formats). For example, control subsystem 112 may direct HDMI source device 102 to select an output audio format supported by HDMI source device 102. Accordingly, HDMI source device 102 may output an HDMI signal including audio defined in accordance with the selected audio format.

In step 406, the audio format of the HDMI signal output by HDMI source device 102 may be verified. The verification may be performed in any suitable way, including by the control subsystem 112 requesting, obtaining, and analyzing an audio portion of the HDMI signal. As another example, control subsystem 112 may capture audio output (e.g., using a microphone) and verify that the audio output is being rendered and/or the quality with which the audio is being rendered.

After step 406 has been performed for the input audio format source and output audio format selected in steps 402 and 404, respectively, control subsystem 112 may determine, in step 408, whether there is another output audio format to be tested. If there is another output audio format to be tested, processing may move from step 408 to step 404, in which control subsystem 112 may direct HDMI source device 102 to select another output audio format.

Step 406 may then be performed for the other output audio format source selected in step 404. In this or a similar manner, control subsystem 112, through repetition of steps 404-406, may step through and conduct testing for each output audio format supported by HDMI source device 102. To illustrate, HDMI source device 102 may be configured to output audio in surround sound, stereo, and mono audio formats, and steps 404-406 may be repeated for each of the output audio formats.

Returning to step 408, if control subsystem 112 determines that there is no other output audio format to be tested, processing may move to step 410. In step 410, control subsystem 112 may determine whether there is another input audio format or source to be tested. If there is another input audio format or source to be tested, processing may move from step 410 to step 402, in which control subsystem 112 may direct HDMI source device 102 to select another input audio format source (e.g., by tuning to another content carrier channel carrying content having a different audio format). Steps 404-408 may then be performed for the other input audio format source selected in step 402. In this or a similar manner, control subsystem 112, through repetition of steps 402-410, may step through and conduct testing for each source audio format supported by HDMI source device 102. To illustrate, HDMI source device 102 may be configured to receive input audio in AC3 and PCM audio formats, and steps 402-410 may be repeated for each of the source audio formats.

Returning to step 410, if control subsystem 112 determines that there is no other input audio format or source to be tested, method 300 may end.

Method 400 may be performed as part of steps 212 and 214 of method 200 when the test EDID activated in step 210 specifies all applicable audio formats. Additionally or alternatively, method 400 may be performed as part of steps 212 and 214 of method 200 when the test EDID activated in step 210 omits an audio format description.

Table 2, which is presented below, lists exemplary operations that may be performed by one or more elements of system 100 when methods 200 and 400 are executed for a set-top box ("STB") connected to a television ("TV").

TABLE 2

Exemplary Audio Source Test Operations

Figure 5:
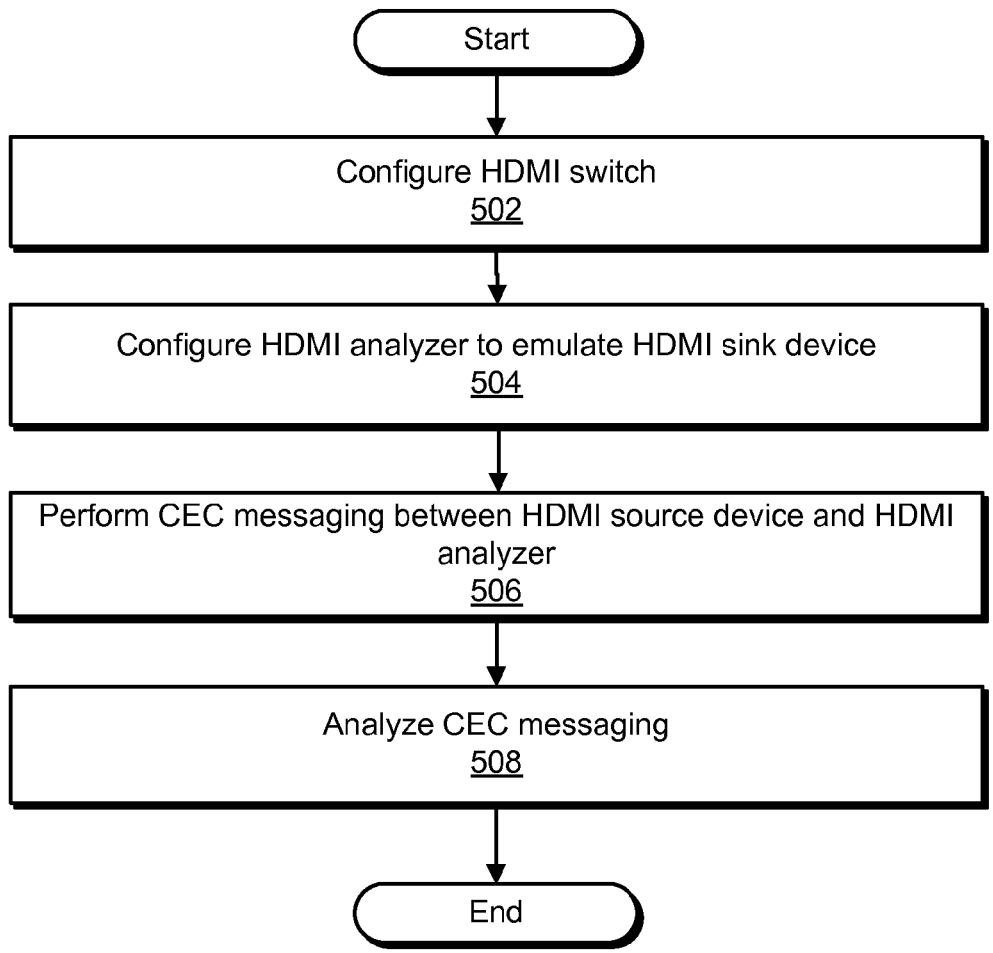

1. Activate selected EDID
2. Ensure STB is fully operational
3. Channel change to AC3 audio programming
4. While tuning AC3 programming, configure STB for Surround Sound and verify audio format
5. While tuning AC3 programming, configure STB for Stereo and verify audio format
6. While tuning AC3 programming, configure STB for Monaural and verify audio format
7. Channel change to PCM programming
8. While tuning PCM programming, configure STB for Surround Sound and verify audio format
9. While tuning PCM programming, configure STB for Stereo and verify audio format
10. While tuning PCM programming, configure STB for Monaural and verify audio format FIG. 5 illustrates an exemplary CEC source testing method 500. In certain embodiments, method 500 may be performed as part of steps 212 and/or 214 of FIG. 2. In other embodiments, method 500 may be performed separately and/or independently of method 200.

In step 502, an HDMI switch may be configured to CEC testing. Step 502 may be performed in any suitable way. For example, control subsystem 112 may communicate with HDMI router-switch 106 to configure HDMI router-switch 106 to function as an HDMI switch. As another example, an HDMI router may be automatically and/or manually swapped out and replaced with an HDMI switch between HDMI source device 102 and HDMI analyzer 108.

In step 504, HDMI analyzer 108 may be configured to emulate HDMI sink device 110. Step 504 may be performed in any suitable way. For example, control subsystem 112 may communicate with HDMI analyzer 108 to configure HDMI analyzer 108 to emulate HDMI sink device 110, such as by emulating a logical CEC address of a television equipped with On-Screen Display ("OSD").

In step 506, CEC messaging may be performed between HDMI source device 102 and HDMI analyzer 108. For example, control subsystem 112 may direct HDMI source device 102 and/or HDMI analyzer 108 to generate and output one or more CEC messages including one or more CEC operational codes.

In step 508, CEC messaging in step 506 may be analyzed. For example, control subsystem 112 may request, obtain, and analyze feedback from HDMI source device 102 and/or HDMI analyzer 108 to determine whether HDMI source device 102 and/or HDMI analyzer 108 are operating appropriately based on the CEC messaging.

In addition to testing CEC operability of HDMI source device 102, system 100 may be further configured to test for CEC interference. For example, method 500 may be executed with one or more additional HDMI devices interconnected with HDMI source device 102 and HDMI analyzer 108. To illustrate, an additional HDMI device, which may or may not be configured with CEC functionality, may be connected to HDMI analyzer 108 either directly or via HDMI switch 106. With the additional HDMI device connected, steps 506 and 508 may be performed to transmit and analyze CEC messaging between HDMI source device 102 and HDMI analyzer 108. Control subsystem 112 may be configured to compare an analysis of CEC messaging performed with the additional HDMI device connected to an analysis of CEC messaging performed without the additional HDMI device connected to determine whether the additional HDMI device, when connected, interferes with the CEC messaging between HDMI source device 102 and HDMI analyzer 108.

In certain embodiments, control subsystem 112 may be configured to direct HDMI switch 106 to reconfigure in order to automatically connect and/or disconnect various HDMI devices to one another and/or to HDMI analyzer 108 for CEC operability and/or interference testing. For example, an array of HDMI source devices may be connected to input ports of HDMI switch 106, and control subsystem 112 may direct HDMI switch 106 to switch one of the HDMI source devices into play at a time (e.g., by connecting the input port to which the HDMI source device is connected to the output port to which HDMI analyzer 108 is connected). Accordingly, multiple HDMI source devices, types of HDMI source devices, and/or interconnection configurations thereof may be tested for CEC operability and/or interference in an automated and efficient manner.

Interoperability test routines may be configured to test interoperability between interconnected HDMI devices (e.g., interoperability between HDMI source device 102 and HDMI sink device 110). In certain examples, interoperability test routines may be configured to determine whether correct video and/or audio is rendered in a specific HDMI environment (e.g., whether HDMI sink device 110 renders correct video and/or audio in a particular interconnection configuration of HDMI devices).

Figure 6:
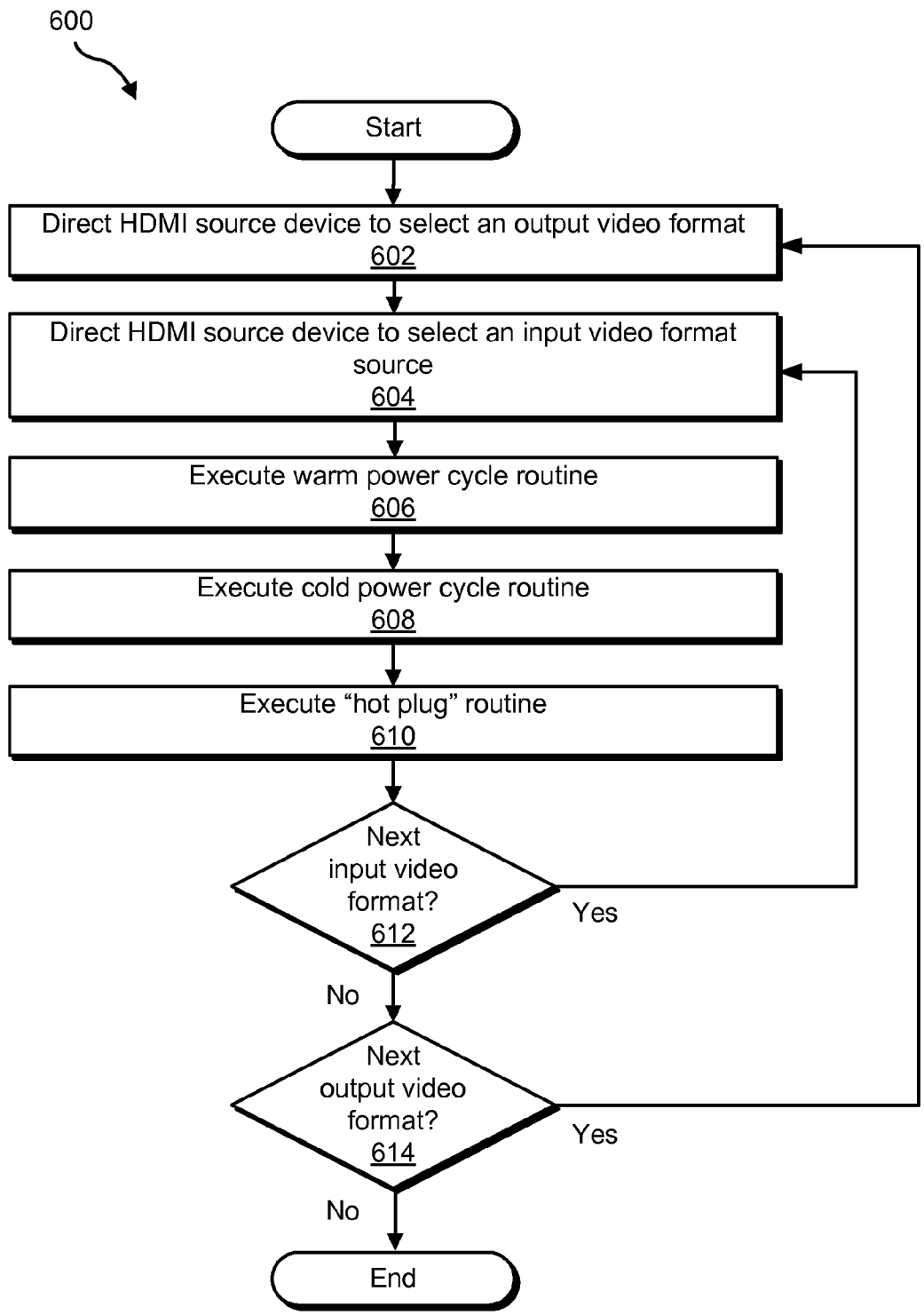
FIG. 6 illustrates an exemplary HDMI interoperability testing method according to principles described herein.

FIG. 6 illustrates an exemplary HDMI interoperability testing method 600. While FIG. 6 illustrates exemplary steps according to one embodiment, other embodiments may omit, add to, reorder, combine, and/or modify any of the steps shown in FIG. 6. The steps shown in FIG. 6 may be performed by control subsystem 112 and/or any other element or elements of system 100.

In step 602, control subsystem 112 may direct HDMI source device 102, which is connected to HDMI sink device 110 via HDMI router-switch 106, to select an output video format. For example, control subsystem 112 may direct HDMI source device 102 to select a particular output video resolution supported by HDMI source device 102.

In step 604, control subsystem 112 may direct HDMI source device 102 to select an input video format source. For example, control subsystem 112 may direct HDMI source device 102 to select a particular content source that provides input to HDMI source device 102 in a particular video format supported by HDMI source device 102. In certain examples, step 604 may include HDMI source device 102 tuning to a particular media content carrier channel or otherwise accessing content from a source that provided content defined in accordance with the particular video format.

In step 606, a warm power cycle routine may be executed. The warm power cycle routine may include cycling the power at HDMI source device 102 and/or HDMI sink device 110. For example, control subsystem 112 may communicate with HDMI source device 102 to direct HDMI source device 102 to power off and then power back on. In response, HDMI source device 102 may power down and back up, as described herein. HDMI sink device 110 may be similarly warm power cycled before, concurrent to, or after the warm power cycling of HDMI source device 102.

The warm power cycle routine in step 606 may further include control subsystem 112 verifying that video is correctly rendered by HDMI sink device 110 before and after an HDMI device is warm power cycled. For example, control subsystem 112 may include a camera configured to capture an image of a display screen of HDMI sink device 110 and process the image to determine whether video is correctly rendered by HDMI sink device 110 before and after HDMI source device 102 is warm power cycled. Additionally or alternatively, control subsystem 112 may verify that video is rendered by HDMI sink device 110 before and after HDMI sink device 110 is warm power cycled.

In step 608, a cold power cycle routine may be executed. Step 608 may be executed similarly to step 606, except that rather than a warm power cycling of HDMI source device 102 and/or HDMI sink device 110, control subsystem 112 may cold power cycle HDMI source device 102 and/or HDMI sink device 110 by physically cutting off power (e.g., AC power) to HDMI source device 102 and/or HDMI sink device 110, as described above.

In step 610, a "hot plug" routine may be executed. The "hot plug" routine may include automatically hot plugging an HDMI connection between HDMI source device 102 and HDMI sink device 110 one or more times, such as by control subsystem 112 directing HDMI router-switch 106 to physically disestablish and reestablish the HDMI connection one or more times.

The "hot plug" routine in step 606 may further include control subsystem 112 verifying that video is rendered by HDMI sink device 110 before and after hot plugging an HDMI connection. The verification may be performed as described above.

After steps 606-610 have been performed for the input video format source selected in step 604, control subsystem 112 may determine, in step 612, whether there is another input video format or source to be tested. If there is another input video format or source to be tested, processing may move from step 612 to step 604, in which control subsystem 112 may direct HDMI source device 102 to select another input video format source (e.g., by tuning to another content carrier channel carrying content having a different video format). Steps 606-610 may then be performed for the other input video format source selected in step 604. In this or a similar manner, control subsystem 112, through repetition of steps 604-612, may step through and test HDMI interoperability for each source video format supported by HDMI source device 102. To illustrate, HDMI source device 102 may be configured to receive input video in 480i, 480p, 720p, and 1080i video formats, and steps 604-612 may be repeated for each of the source video formats.

Returning to step 612, if control subsystem 112 determines that there is no other input video format or source to be tested, processing may move to step 614. In step 614, control subsystem 112 may determine whether there is another output video format to be tested. If there is, processing may move from step 614 to step 602, in which another output video format may be selected. Steps 604-612 may then be repeated for the other output video format selected in step 602. In this or similar manner, control subsystem 112, through repetition of steps 602-614, may step through and conduct testing for each output video format supported by HDMI source device 102. To illustrate, HDMI source device 102 may be configured to output video in 480i, 480p, 720p, and 1080i video formats, and steps 602-614 may be repeated for each of the video formats.

Returning to step 614, if control subsystem 112 determines that there is no other output video format to be tested, method 600 may end.

In addition or alternative to testing interoperability for each output and input video format as described above, method 600 may be modified and/or executed to test interoperability of HDMI devices for specific output and input audio formats. In such an application of method 600, control subsystem 112 may be configured to verify whether HDMI sink device 110 correctly renders audio, such as by employing a microphone to capture audio output by HDMI sink device 110 for analysis. One or more steps of modified method 600 may be repeated to test interoperability for all applicable audio formats (e.g., AC3, PCM, surround sound, stereo, mono, etc.).

Sink test routines may be configured to test behavior of HDMI sink device 110. Sink test routines may be configured to determine whether HDMI sink device 110 correctly handles various video and/or audio formats. In certain embodiments, sink test routines are configured to be performed only in response to a failure discovered during interoperability testing of HDMI devices.

In an exemplary sink test routine, control subsystem 112 may be configured to direct HDMI router-switch 106 for establish a connection between HDMI pattern generator 104 and HDMI sink device 110, direct HDMI pattern generator 104 to generate and output one or more HDMI signals to HDMI sink device 110, and capture and analyze video and/or audio output by HDMI sink device 110 (e.g., using a camera and/or microphone as described above). The sink test routine may be used to determine whether HDMI sink device 110 correctly processes various video and/or audio formats.

In certain embodiments, one or more of the components (e.g., control subsystem 112) and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

One or more of the processes described herein may be implemented at least in part as instructions executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 7:
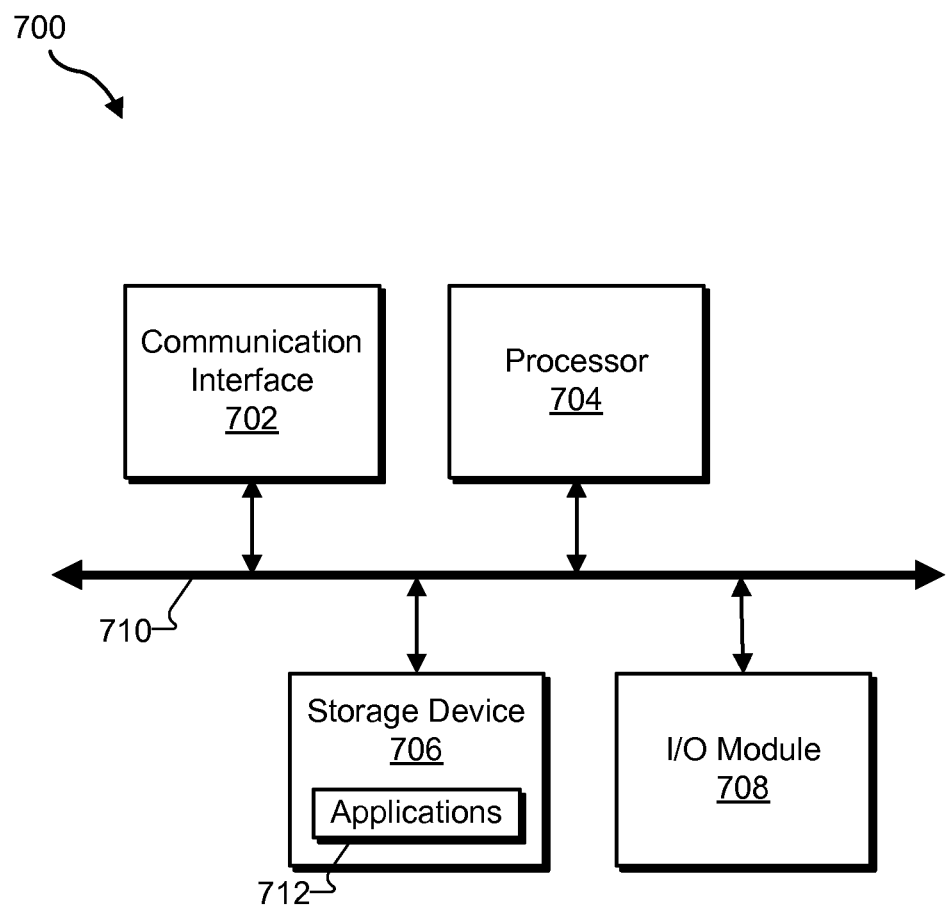
FIG. 7 illustrates an exemplary computing device according to principles described herein.

FIG. 7 illustrates an exemplary computing device 700 configured to perform one or more of the processes described herein. In certain embodiments, computing device 700 may implement control subsystem 112 and/or one or more other element of system 100. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, and any other suitable interface. In at least one embodiment, communication interface 702 may provide a direct connection between testing subsystem 102 and gateway device 104 via a direct link to a network, such as the Internet. Communication interface 702 may additionally or alternatively provide such a connection through, for example, a local area network (such as an Ethernet network), a personal area network, a telephone or cable network, a satellite data connection, a dedicated URL, or any other suitable connection. Communication interface 702 may be configured to interface with any suitable communication media, protocols, and formats, including any of those mentioned above.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a High-Definition Multimedia Interface (HDMI) analyzer that is configured to receive and analyze HDMI signals and output a test signal to be used in one or more automated HDMI test routines;
    an HDMI router-switch having one or more input ports connected to one or more HDMI source devices and output ports connected to the HDMI analyzer and one or more HDMI sink devices, the HDMI router-switch configured to establish and disestablish HDMI connections between the one or more HDMI source devices and the HDMI analyzer and the one or more HDMI sink devices; and
    a control subsystem configured to control the HDMI analyzer, the HDMI router-switch, the one or more HDMI source devices, and the one or more HDMI sink devices;
    the control subsystem configured to direct one or more of the HDMI analyzer, the HDMI router-switch, the one or more HDMI source devices, and the one or more HDMI sink devices to perform one or more operations to execute the one or more automated HDMI test routines, and
    the one or more automated HDMI test routines including the HDMI analyzer
        outputting the test signal to the one or more HDMI source devices; and
        analyzing an HDMI signal output by the one or more HDMI source devices in response to the test signal, for each output video format, output audio format, input video format, and input audio format supported by the one or more HDMI source devices.

2. The system of claim 1, wherein the one or more automated HDMI test routines comprise one or more HDMI source device test routines that test behavior of the one or more HDMI source devices.

3. The system of claim 2, wherein the one or more automated HDMI test routines comprise one or more HDMI video test routines, one or more HDMI audio test routines, one or more HDMI Consumer Electronics Control (CEC) operability test routines, and one or more HDMI CEC non-interference test routines.

4. The system of claim 3, wherein the one or more HDMI CEC non-interference test routines determine whether an HDMI source device within the one or more HDMI source devices interferes with CEC operability of at least one other HDMI source device within the one or more HDMI source devices and at least one HDMI sink device within the one or more HDMI sink devices.

5. The system of claim 2, wherein the one or more HDMI source device test routines determine whether the one or more HDMI source devices correctly interpret a test Extended Display Identification Data (EDID) signal.

6. The system of claim 5, wherein the one or more HDMI source device test routines determine whether the one or more HDMI source devices output correctly formatted and timed video and audio signals for the test EDID signal.

7. The system of claim 5, wherein the one or more HDMI source device test routines determine whether the one or more HDMI source devices output correct video and audio information frames for the test EDID signal.

8. The system of claim 5, wherein
    the one or more HDMI source device test routines include the control subsystem directing the HDMI router-switch to block one or more actual EDID signals provided by the one or more HDMI sink devices; and
    the outputting of the test signal by the HDMI analyzer includes outputting the test EDID signal to the one or more HDMI source devices.

9. The system of claim 2, wherein the one or more HDMI source device test routines determine whether the one or more HDMI source devices successfully High Definition Content Protection (HDCP) handshake with the one or more HDMI sink devices.

10. The system of claim 1, wherein the one or more automated HDMI test routines comprise one or more HDMI interoperability test routines configured for testing interoperability between the one or more HDMI source devices and the one or more HDMI sink devices.

11. The system of claim 10, wherein the one or more HDMI interoperability test routines determine whether the one or more HDMI sink devices render correct video and audio.

12. The system of claim 10, wherein the one or more automated HDMI test routines comprise one or more HDMI sink device test routines that test behavior of the one or more HDMI sink devices in response to a failure detected by the one or more HDMI interoperability test routines.

13. The system of claim 1, wherein the one or more automated HDMI test routines include the control subsystem
directing the one or more HDMI source devices and the one or more HDMI sink devices to warm power cycle;
obtaining feedback from at least one of the one or more HDMI source devices and the one or more HDMI sink devices both before and after the warm power cycle; and
analyzing the feedback.

14. The system of claim 1, wherein the one or more automated HDMI test routines include the control subsystem
directing the one or more HDMI source devices and the one or more HDMI sink devices to cold power cycle;
obtaining feedback from at least one of the one or more HDMI source devices and the one or more HDMI sink devices both before and after the cold power cycle; and
analyzing the feedback.

15. The system of claim 1, wherein the one or more automated HDMI test routines include the control subsystem
directing the HDMI router-switch to hot plug the HDMI connections between the one or more HDMI source devices and the one or more HDMI sink devices;
obtaining feedback from at least one of the one or more HDMI source devices and the one or more HDMI sink devices both before and after the hot plug; and
analyzing the feedback.

16. The system of claim 1, wherein the one or more automated HDMI test routines include the control subsystem
directing the one or more HDMI source devices to step through output video and audio formats and input video and audio formats;
obtaining feedback from the one or more HDMI source devices and the one or more HDMI sink devices for each of the output video and audio formats and each of the input video and audio formats; and
analyzing the feedback.

17. The system of claim 1, wherein:
the one or more HDMI source devices comprise one or more set-top boxes; and
the one or more HDMI sink devices comprise one or more televisions.

18. A system comprising:
a High-Definition Multimedia Interface (HDMI) analyzer that is configured to receive and analyze HDMI signals and output a test signal to be used in one or more automated HDMI source device test routines;
an HDMI router-switch having an input port connected to an HDMI source device and an output port connected to the HDMI analyzer, the HDMI router-switch configured to establish and disestablish an HDMI connection between the HDMI source device and the HDMI analyzer; and
a control subsystem configured to control the HDMI analyzer, the HDMI router-switch, and the HDMI source device;
the control subsystem configured to direct one or more of the HDMI router-switch, the HDMI source device, and the HDMI analyzer to perform one or more operations to execute the one or more automated HDMI source device test routines configured for testing behavior of the HDMI source device;
the one or more automated HDMI source device test routines include the control subsystem
directing the HDMI analyzer to output the test signal to the HDMI source device,
directing the HDMI source device to step through output video and audio formats and input video and audio formats supported by the HDMI source device in response to the test signal,
interrogating at least one of the HDMI source device, the HDMI router-switch, and the HDMI analyzer for an HDMI signal output by the HDMI source device for each of the output video and audio formats and each of the input video and audio formats, and
analyzing the HDMI signal output by the HDMI source device for each of the output video and audio formats and each of the input video and audio formats.

19. The system of claim 18, wherein the one or more automated HDMI source device test routines include the control subsystem, for each of the output video and audio formats and each of the input video and audio formats,
directing the HDMI source device to warm power cycle;
interrogating at least one of the HDMI source device, the HDMI router-switch, and the HDMI analyzer for an HDMI signal output by the HDMI source device both before and after the warm power cycle; and
analyzing the HDMI signal output by the HDMI source device both before and after the warm power cycle.

20. The system of claim 19, wherein the one or more automated HDMI source device test routines include the control subsystem, for each of the output video and audio formats and each of the input video and audio formats,
directing the HDMI source device to cold power cycle;
interrogating at least one of the HDMI source device, the HDMI router-switch, and the HDMI analyzer for an HDMI signal output by the HDMI source device both before and after the cold power cycle; and
analyzing the HDMI signal output by the HDMI source device both before and after the cold power cycle.

21. The system of claim 18, wherein:
the HDMI router-switch includes another output port connected to an HDMI sink device, the HDMI router-switch further configured to establish and disestablish an HDMI connection between the HDMI source device and the HDMI sink device;
the control subsystem is further configured to direct one or more of the HDMI router-switch, the HDMI source device, the HDMI sink device, and the HDMI analyzer to perform one or more operations to execute one or more automated HDMI interoperability test routines configured for testing interoperability between the HDMI source device and the HDMI sink device;
wherein the one or more automated HDMI interoperability test routines include the control subsystem
directing the HDMI source device to output an HDMI signal; and
verifying that the HDMI sink device renders correct video and audio for the HDMI signal.

22. A method comprising:
directing, by a control subsystem, a High-Definition Multimedia Interface (HDMI) analyzer to output a test signal to an HDMI source device connected to the HDMI analyzer by an HDMI connection established via an HDMI router-switch;
directing, by the control subsystem, the HDMI source device to step through and output an HDMI signal in response to the test signal, for each output video format, output audio format, input video format, and input audio format supported by the HDMI source device;
interrogating, by the control subsystem, at least one of the HDMI source device, the HDMI router-switch, and the HDMI analyzer for the HDMI signal output by the HDMI source device for each output video format, output audio format, input video format, and input audio format supported by the HDMI source device; and analyzing, by the control subsystem, the HDMI signal output by the HDMI source device for each output video format, output audio format, input video format, and input audio format supported by the HDMI source device in order to test behavior of the HDMI source device.

23. The method of claim 22, further comprising, for each output video format, output audio format, input video format, and input audio format supported by the HDMI source device, directing, by the control subsystem, the HDMI source device to warm power cycle;

interrogating, by the control subsystem, at least one of the HDMI source device, the HDMI router-switch, and the HDMI analyzer for an HDMI signal output by the HDMI source device both before and after the warm power cycle; and analyzing, by the control subsystem, the HDMI signal output by the HDMI source device both before and after the warm power cycle.

24. The method of claim 22, further comprising, for each output video format, output audio format, input video format, and input audio format supported by the HDMI source device, directing, by the control subsystem, the HDMI source device to cold power cycle;

interrogating, by the control subsystem, at least one of the HDMI source device, the HDMI router-switch, and the HDMI analyzer for an HDMI signal output by the HDMI source device both before and after the cold power cycle; and analyzing, by the control subsystem, the HDMI signal output by the HDMI source device both before and after the cold power cycle.

25. The method of claim 22, embodied as computer-executable instructions on at least one non-transitory computer-readable medium.

* * * * *